United States Patent [19]
Naumann et al.

[11] Patent Number: 5,890,854
[45] Date of Patent: Apr. 6, 1999

[54] SHAPING TOOL FOR STOCK REMOVAL MACHINING OF WHEELSETS

[75] Inventors: Hans J. Naumann, Albany, N.Y.; Ross Hermann, Nuremberg, Germany; Reinhard Robotta, Erlau, Germany; Hans Lutze, Chemnitz, Germany

[73] Assignee: Niles-Simmons Industrieanlagen GmbH, Chemnitz, Germany

[21] Appl. No.: 722,111

[22] PCT Filed: Mar. 25, 1995

[86] PCT No.: PCT/DE95/00405

§ 371 Date: Feb. 18, 1997

§ 102(e) Date: Feb. 18, 1997

[87] PCT Pub. No.: WO95/26246

PCT Pub. Date: Oct. 5, 1995

[30] Foreign Application Priority Data

Mar. 29, 1994 [DE] Germany .................. 94 05 317 U

[51] Int. Cl.⁶ ........................................ B23C 9/00
[52] U.S. Cl. .................. 409/132; 82/105; 407/34; 407/42; 407/48; 409/166; 409/199
[58] Field of Search .................. 407/34, 40, 42, 407/48, 53, 58, 59, 61; 82/104, 105; 409/131, 132, 199, 165, 166, 179

[56] References Cited

U.S. PATENT DOCUMENTS

| | | | |
|---|---|---|---|
| 234,635 | 11/1880 | Wenchel | 409/131 |
| 1,472,960 | 11/1923 | Conklin | 407/58 |
| 3,116,538 | 1/1964 | Severson | 407/42 |
| 4,352,609 | 10/1982 | Hopkins | 407/42 |
| 4,789,273 | 12/1988 | Wiacek et al. | 407/34 |
| 4,808,044 | 2/1989 | Tsujimura et al. | 407/61 |
| 4,995,767 | 2/1991 | Segal | 407/34 |
| 5,425,603 | 6/1995 | Dutschke et al. | 407/40 |
| 5,678,963 | 10/1997 | Heimann | 409/131 |
| 5,678,966 | 10/1997 | Heimann | 82/105 |

*Primary Examiner*—Daniel W. Howell
*Assistant Examiner*—Christopher Kirkman
*Attorney, Agent, or Firm*—Howard J. Greenwald

[57] ABSTRACT

A shaping tool for the stock-removal machining of wheelsets. The tool contains a shell-end milling cutter comprised of a disc-shaped body with a multiplicity of cutting edges which overlap each other and are disposed spirally staggered on pitch circles on such disc-shaped body.

11 Claims, 6 Drawing Sheets

SHAPING TOOL FOR STOCK REMOVAL MACHINING OF WHEELSETS

CROSS-REFERENCE TO RELATED PATENT APPLICATION

The application is based upon International Application PCT/DE95/00405, filed on Mar. 25, 1995, which claims priority based on German patent application G 94 05 317.0 U, which was filed on Mar. 29, 1994.

FIELD OF THE INVENTION

A shaping tool for the stock-removal machining of sets of rail-vehicle wheels by means of rotating tools.

BACKGROUND OF THE INVENTION

During operation the wheels of railroad rolling stock (such as locomotives and railroad cars) become worn. This wear often increases the risk of train derailment and, additionally, may accelerate wheel wear or otherwise adversely affect the running characteristics of the wheels.

The wheels of railroad rolling stock may, with wear, develop flat areas on their circumferences. Such wear often causes a bumpy or vibratory rotation of the worn wheel against the rail. Additionally, worn wheels may cause derailment of the railway vehicle.

The contours of the wheel tires of railway wheelsets are the subject of international standardization. During operation, the peripheral surfaces of such wheel tires and/or wheel rims undergo severe wear, especially from the tips of the flanges to the outside wheel-tire surfaces or the wheel-rim surfaces. Thus, especially with high-speed trains, the wheel tires and wheel rims should be reshaped to reduce or minimize the bearing or bogie loads of the rail vehicles and the concomitant wear of rail surfaces.

Railway wheelsets may be trued with stock removal carried out, e.g., by a turning or milling process. Thus, e.g., peripheral milling machines, which are adapted to remove metal by feeding a workpiece through the periphery of a rotating circular cutter (such as a milling cutter), are often used.

Additionally, cutter heads, or shell end-milling cutters which duplicate the wheel shape desired in part or whole, are often used as tools for wheel shaping. By way of illustration, U.S. Pat. No. 3,540,103 of Oliver Saari (the disclosure of which is hereby incorporated by reference into this specification) discloses a milling cutter for truing wheels of railroad cars and locomotives. The milling cutter of this patent comprises a body of substantially circular cross-section and a plurality of center buttons rigidly associated with the surface of the body, the buttons being arranged in a plurality of spaced ranks to establish a helical array of buttons about the surface of the body, wherein the buttons are spaced within such ranks that buttons which are adjacent in the helical array lie in non-adjacent ranks. A similar cutter is disclosed in U.S. Pat. No. 2,645,003, the disclosure of which is also hereby incorporated by reference into this specification.

It is an object of this invention to provide a shaping tool which is adapted to duplicate at least a portion of a wheel shape.

It is another object of this invention to provide a process for shaping the contour of a wheel which provides good efficiency and optimum chip breaking capacity while simultaneously maximizing tool life.

It is yet another object of this invention to provide a process for shaping the contour of a wheel which provides high surface finish of the wheel with substantially no shape distortion.

SUMMARY OF THE INVENTION

In accordance with the invention, there is provided a shaping tool for the stock-removal machining of wheelsets. The tool contains a shell-end milling cutter comprised of a disc-shaped body with a multiplicity of cutting edges which overlap each other and are disposed spirally staggered on pitch circles on such disc-shaped body.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

The device of this invention is comprised of a shaping tool for the stock-removal machining of sets of rail-vehicle wheels ("wheelsets"). This device also may be used to machine individual wheels, wheel tires, wheel rims, and the like.

As will be apparent to those skilled in the art, the device of this invention is adapted to at least partially duplicate a wheel shape with good efficiency and optimum chip breaking capacity, producing machined wheels with a high surface finish but without shape distortion.

The device of this invention may be disposed parallel to the wheelset axis (axially parallel round shaping) or perpendicular to the wheelset axis (axially vertical round shaping). Alternatively, in plunge-cut processing, the shaping tool may be set to the required size of the wheel shape, and the machining process may be completed by means of round feed after one revolution of the wheel tire.

Thus, in one embodiment, the wheel shape of the running surface with outside wheel flange face to the tip of the flange is produced in one cut by axially vertical round shaping. Partial machining operations at the wheel shape, in particular at worn-out sections of the running surface and the outside flange face of the wheel shape, are possible. Because of the geometry of the cutting tool, and the different distances of the various cutter tips used from the center of revolution of the tool, different cutting speeds may be used during the milling process. Thus, e.g., the running surfaces of the wheel shape can be machined with lower speeds while sections of the wheel flange may be machined with higher speeds at the same time. Hard points on the wheel surface, and substantially compacted work surfaces, can be advantageously machined with lower cutting speeds.

While applicants do not wish to be bound to any particular theory, it is believed that, in the axially vertical round shaping process, inherent compressive strains are produced at the wheel surfaces during machining, thereby ensuring high permanent loadability and wear resistance and the reshaped wheel faces. Due to the disposition of the cutter tips in the device of this invention, a relatively high stock removal rate can be obtained. It is believed that there is relatively low rate of heat ingress into the surfaces of the wheel to be shaped during such process.

In one embodiment, wherein a symmetrical wheel flange is being machined, the residual shaping process can be accomplished by repositioning the cutter and reversing the sense of rotation of either the wheel or the cutter.

In one embodiment, the wheel shape of the inside wheel flange surface from the wheel tire surface to the tip of the flange is machined via axially vertical round shaping in one cut applying a shell end milling cutter. In one aspect of this embodiment, two shell end milling cutters for each wheel operatively connected to a slide for locating the cutting tools are utilized.

In one embodiment, the end-milling cutter is disposed at an eccentricity of about 0 vis-a-vis the wheel surface to be machined. In one aspect of this embodiment, the cutter used is a shell-end milling cutter comprising a disc-shaped body with a multiplicity of cutters disposed thereon which, in combination, duplicate the shape of the wheel surface desired. Thus, e.g., the cutters may be arranged to duplicate the wheel shape section of the running surface and the outside wheel flange face to the tip of the flange. In this embodiment, the cutters disposed in th e area of the running surface are preferably located spirally, staggered, and in a tangentially offset direction. The desired wheel shaping may be obtained during one revolution of the wheelset.

In one embodiment, the overlapping of the cutters in the device of this invention is designed so that each cutting edge is disposed as an effective edge, in accordance with the well known broad-finishing principle.

In another embodiment, the cutters in the shape of the running surface are tangentially disposed in spiral arrangement, and the cutters in the shape of the wheel flange are disposed radially with a gap arrangement at the body. In one aspect, the cutters may be located in cassettes. Upright arrangement of the cutters is preferably selected for the wheel flange shape.

In another embodiment, an end-milling cutter is provided comprising ten cutter groups of cutters disposed spirally at a circumferential angle of 18 degrees. As will be apparent to those skilled in the art, this arrangement can be modified in accordance with the shape and size of the surface to be machined.

Some of the preferred embodiments of the invention will now be described by reference to FIGS. 1–10.

Figure 1:
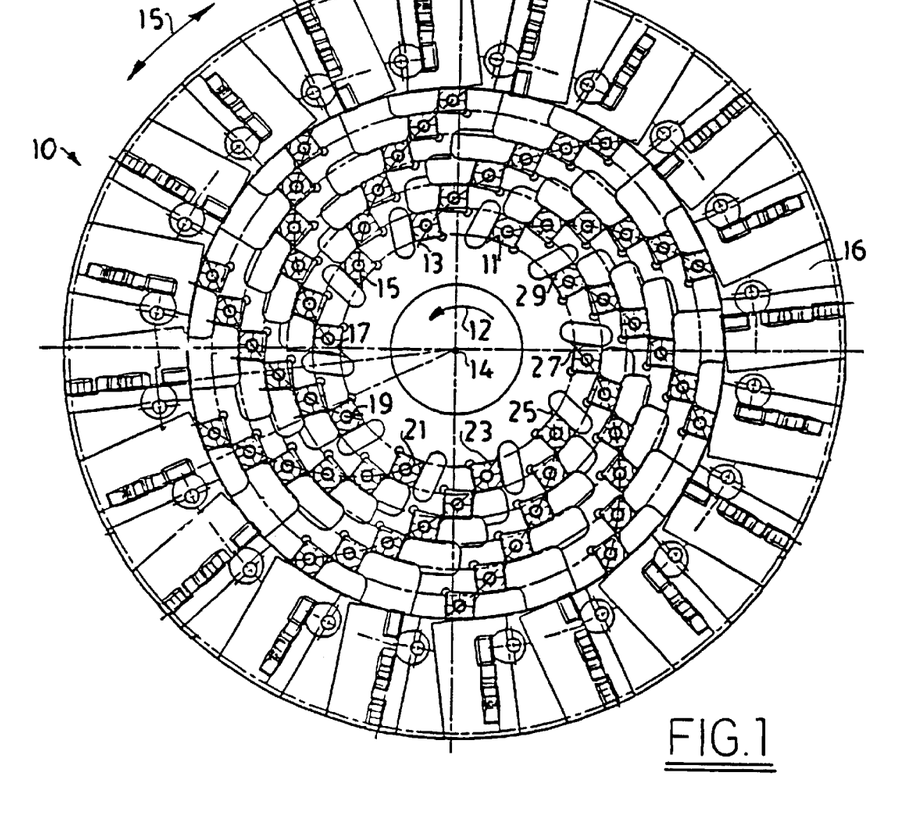
FIG. 1 is a top view of the end face of one preferred cutter of this invention.

FIG. 1 is a top view of the end face of one preferred cutter of this invention. The cutter of FIG. 1 is suitable for machining the wheel flange of the running surface with an outside wheel flange face of a wheel. As is known those skilled in the art, such a tool is generally located on a positioning tool slide equipped with a tool drive of a wheelset machine.

Referring to FIG. 1, it will be seen that the end face 16 of cutter 10, starting from cutter axis 14, is contoured or shaped radially to the outside so that the cutters 50 through 62 (see FIGS. 3, 7, and 8) are preferably located spirally, staggered, an in a tangentially offset direction.

Referring again to FIG. 1, it will also be seen that end face 16 is preferably comprised of a multiplicity of cutters radiating outwardly from about the center of end face 16 towards its periphery. In the preferred embodiment depicted in FIG. 1, these cutters are so disposed that they preferably form a multiplicity of arcuate surfaces 11, 13, 15, 17, 19, 21, 23, and 25. Furthermore, these cutters are preferably uniformly distributed in peripheral direction 15 and are disposed in staggered arrangement with mainly radial effects, with their cutting edges being in active position.

As will be apparent to those skilled in the art, the cutters, due to their staggered positioning in tandem or opposite arrangement, as well as radially from inside to outside, preferably form a continuous cutting edge duplicating the negative of the required shape of the wheel tire or wheel rim.

In one embodiment, ten cutters groups (such as, e.g., cutter groups 11, 13, 15, 17, 19, 21, 23, and/or 25) are disposed in spiral arrangement on end face 16 at a circumferential angle of about 18 degrees.

Referring again to FIG. 1, and in the preferred embodiment described therein, it will be seen that milling cutter 10 rotates in the direction of arrow 12 about cutter axis 14. The end face 16 of cutter 10 is preferably contoured and radially shaped so that the cutting elements form a continuous cutting edge which duplicates the negative of the required shape of the wheel tire or the wheel rim.

Figure 2:
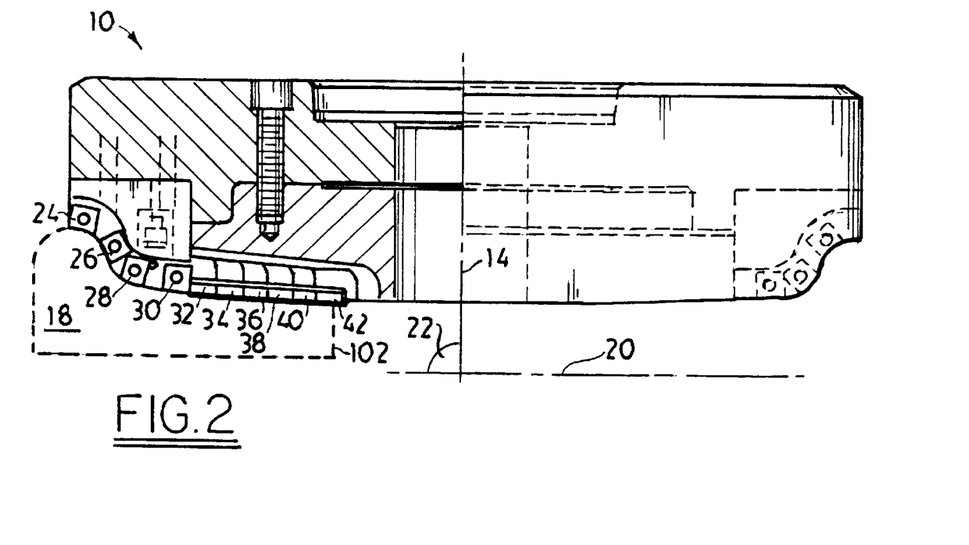
FIG. 2 is a partial sectional view of the cutter of FIG. 1.

The relative position of one embodiment of milling cutter 10 with regard to the cross-sectional shape 18 of a wheel tire or a wheel rim (shown in dotted line outline) during the milling process is illustrated in FIG. 2.

Referring to FIG. 2, it will be seen that the axis 20 of the wheelset being machined (not shown) preferably forms a right angle 22 with the cutter axis 14. Cutting elements 24, 26, 28, 30, 32, 34, 36, 38, 40, and 42 are disposed and adapted to cut the desired shape 18.

Figure 3:
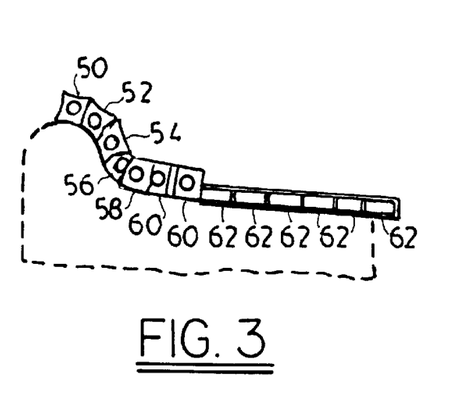
FIG. 3 is a partial schematic view of the cutter of FIG. 2.

FIG. 3 is a schematic view of one preferred cutting arrangement with multi-edge cutters disposed in an upright cutting position. In this preferred cutting arrangement, the multi-edged cutters known to those skilled in the art may be used.

By way of illustration, and not limitation, multi-edged cutting assemblies are disclosed in U.S. Pat. Nos. 3,878,905 (drill with multi-edged cutting member), 3,937,408, 3,938, 230 (rectangular shaped cutting tool with multi-edged insert), 4,015,492 (multi-blade cutter), 4,024,615 (cutter head for multi-edged lathe), 4,141,278 (multi-edged turning machine), 4,211,507 (rotary cutter with radially adjustable reversible tool bits), 4,244,668, 4,294,566 (cutter insert with eight positive cutting edges), 4,409,868 (multi-toothed thread chaser), 4,472,094 (turning tool with multiple, multi-edged cutters), 4,690,185 (rotary cutter with detachably mounted, multi-edged cutting tips), 5,131,478, 5,319,357, 5,353,581 (blade with multiple cutting edges), and the like. The disclosure of each of these United States patents is hereby incorporated by reference into this specification.

Figure 7:
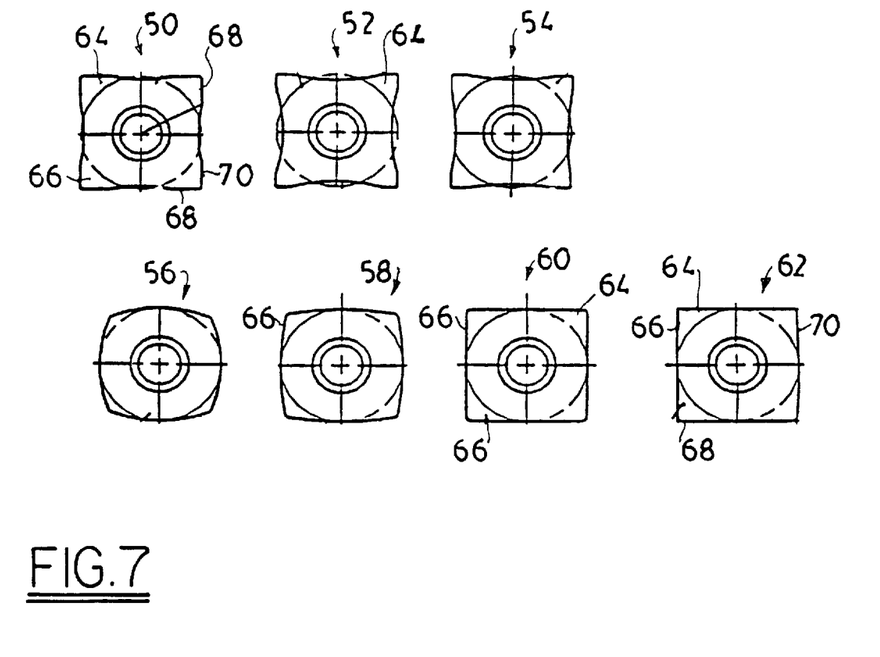
FIG. 7 is a partial top view of the multi-edged cutter of FIG. 1.
Figure 8:
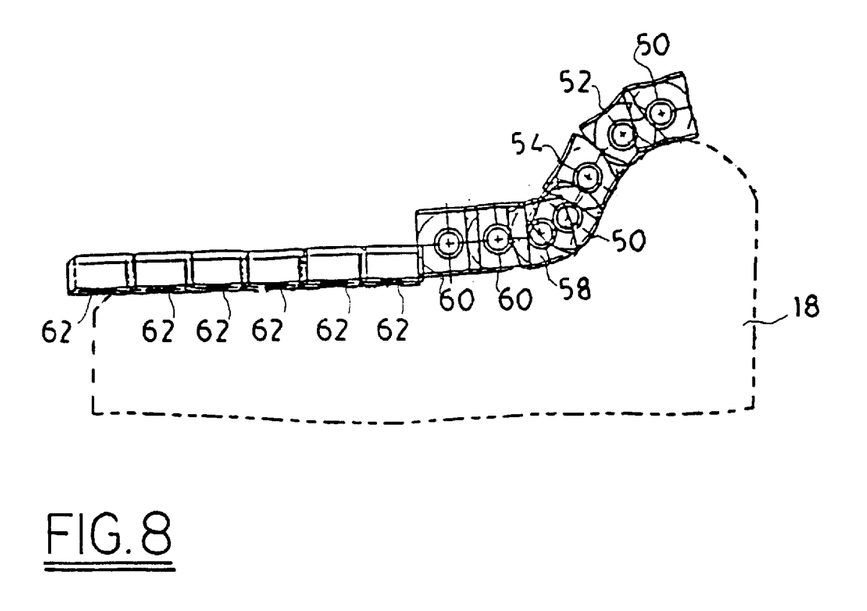
FIG. 8 is a partial schematic view of the cutter of FIG. 2.

Multi-edge cutters 50, 52, 54, 56, 58, and 60 are depicted in FIGS. 3, 7, and 8. These cutters are preferably made of hard cutting material such as, e.g., carbide. Thus, by way of illustration, the abrasive material in the cutters may consist essentially of tungsten carbide, boron carbide, alumina, diamond, cubic boron nitride, titanium nitride, titanium carbide, and the like. See, e.g., U.S. Pat. Nos. 5,210,980, 5,308,367, 5,331,769, 5,365,986, 5,370,944, and the like;

the disclosure of each of these United States patents is hereby incorporated by reference into this specification.

The multi-edged cutters 50, 52, 54, 56, 58, and 60 are in upright cutting position. In the preferred embodiment depicted in FIGS. 3, 7, and 8, these multi-edged cutters preferably have four cutting edges 64, 66, 68, and 70, which are distributed along the periphery of the cutters (see FIG. 7) and can be brought successively in cutting or active position.

The four cutting edges 64, 66, 68, and 70 are contoured according to the shape section to be machined between the tip 74 of the flange (see FIG. 8) and the periphery of the wheel tire.

Figure 4:
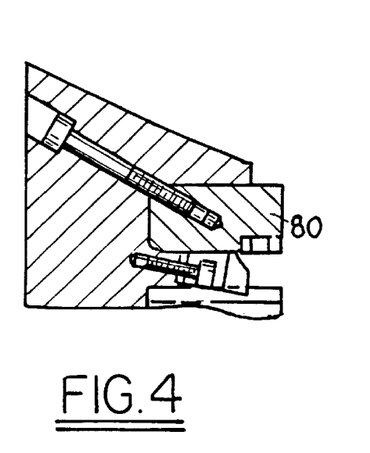
FIG. 4 is a partial sectional view of the cutter of FIG. 2.

After a cutting edge wears out in its cutting position, and referring to FIG. 4, the cutter 10 is rotated in its location (e.g., cassette 80 through its hole axis running perpendicularly to the drawing plane of FIG. 7 through 90 degrees) so that the next cutting edge which is not yet worn out comes into cutting position. After all of the cutting edges 50–62 are worn out, the cutter is used up and may be removed or disposed of.

The use of indexable cutter assemblies is known to those skilled in the art. See, e.g., U.S. Pat. Nos. 5,282,703 (indexable cutter insert), 5,049,011 (indexable cutter chips), 5,017,055 (indexable cutter inserts), 4,844,643 (indexable cutter bit), 4,834,591 (indexable cutter insert), 4,679,968 (indexable cutter insert), 3,497,933 (indexable cutter insert and milling cutter head therefor), 3,434,190, and the like. The disclosure of each of these United States patents is hereby incorporated by reference into this specification.

Referring again to FIGS. 3, 7, and 8, the cutters 50–62, positioned side by side to one radius being in cutting position approximately perpendicularly with regard to their planes, are respectively disposed in selectable groups side by side in radial alignment.

Figure 6:
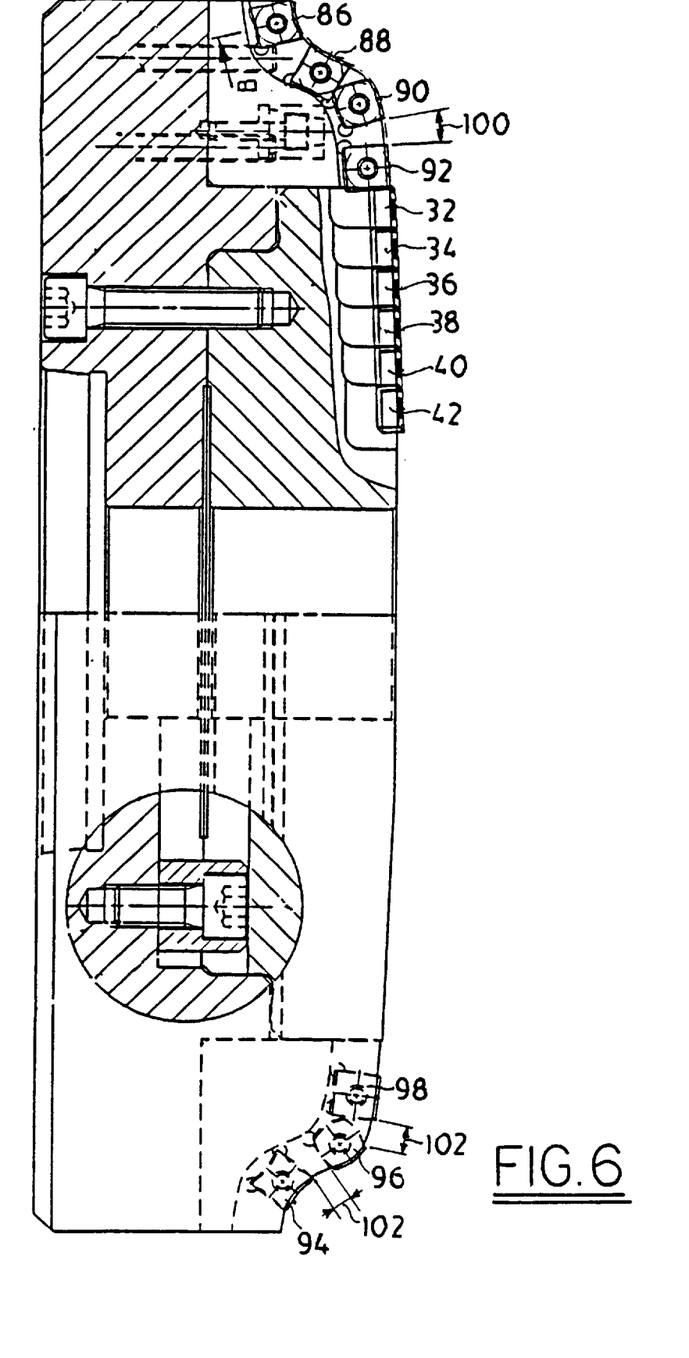
FIG. 6 is an enlarged partial sectional view of the cutter of FIG. 1.

In one preferred embodiment, illustrated in FIG. 6, the selectable groups of cutters are so arranged that so that adjacent cutters 86, 88, 90, 92, or adjacent cutters 94, 96, 98, in radial direction keep a gap 100 or 102 in between.

To ensure continuous shaping at the periphery of the wheel rim, a cutter group 94, 96, 98 is preferably always following a cutter group 86, 88, 90, and 92 in peripheral direction 3 (see FIG. 1), and vice versa. The cutters 86, 88, 90, 92 of either cutter group are staggered with regard to the cutters 94, 96, 98 of the other cutter group, and vice versa.

Figure 5:
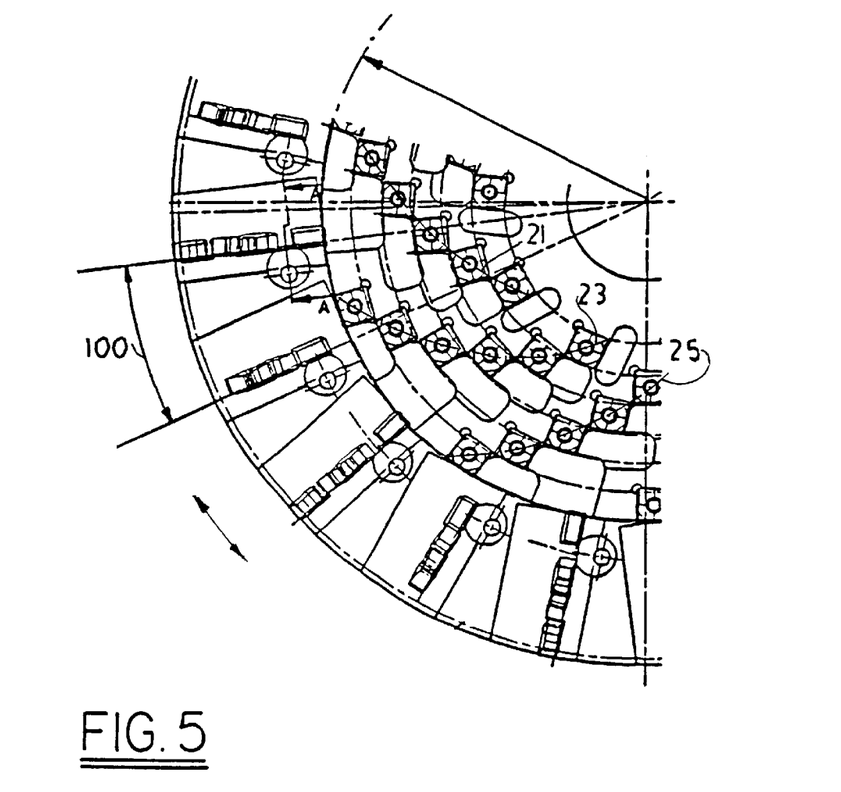
FIG. 5 is an enlarged sectional view of the end face of the cutter of FIG. 1.

Referring to FIG. 5, and in the preferred embodiment depicted therein, 86, 88, 90, 92, and 94, 96, 98 preferably succeed one another in peripheral direction 15 and are preferably positioned vis-a-vis each other at a circumferential angle 100 of 18 degrees. In this embodiment, ten of these cutter groups are distributed uniformly along the periphery of end-milling cutter 10.

Referring to FIG. 2, the peripheral surface of the wheel tire located on the side of running surface 102 is responsible to a large extent for quiet running of the wheelset; and this area requires a particularly fine microstructure. The cutters positioned in horizontal cutting position (cutters 32, 34, 36, 38, 40, and 42 of FIG. 1, e.g.) serve to shape this area. These cutters are preferably staggered in tandem arrangement in peripheral direction 15 so that their adjacent cutting corners slightly overlap each other in radial direction to the cutter axis 14. The radial inside cutter of cutter group 32,34,36, 38,40,42 is advancing the adjacent cutter 32,34,36,38,40,42 being far outside in radial direction to the cutter axis 14 of the same cutter line in the sense of rotation of the cutter. Thus, each disc of the cutter forms a continuous shaping edge with a negative shape to the peripheral face to be reshaped. A second end-milling cutter for machining the inside edge of the wheel flange, not shown, also may be used.

Figure 9:
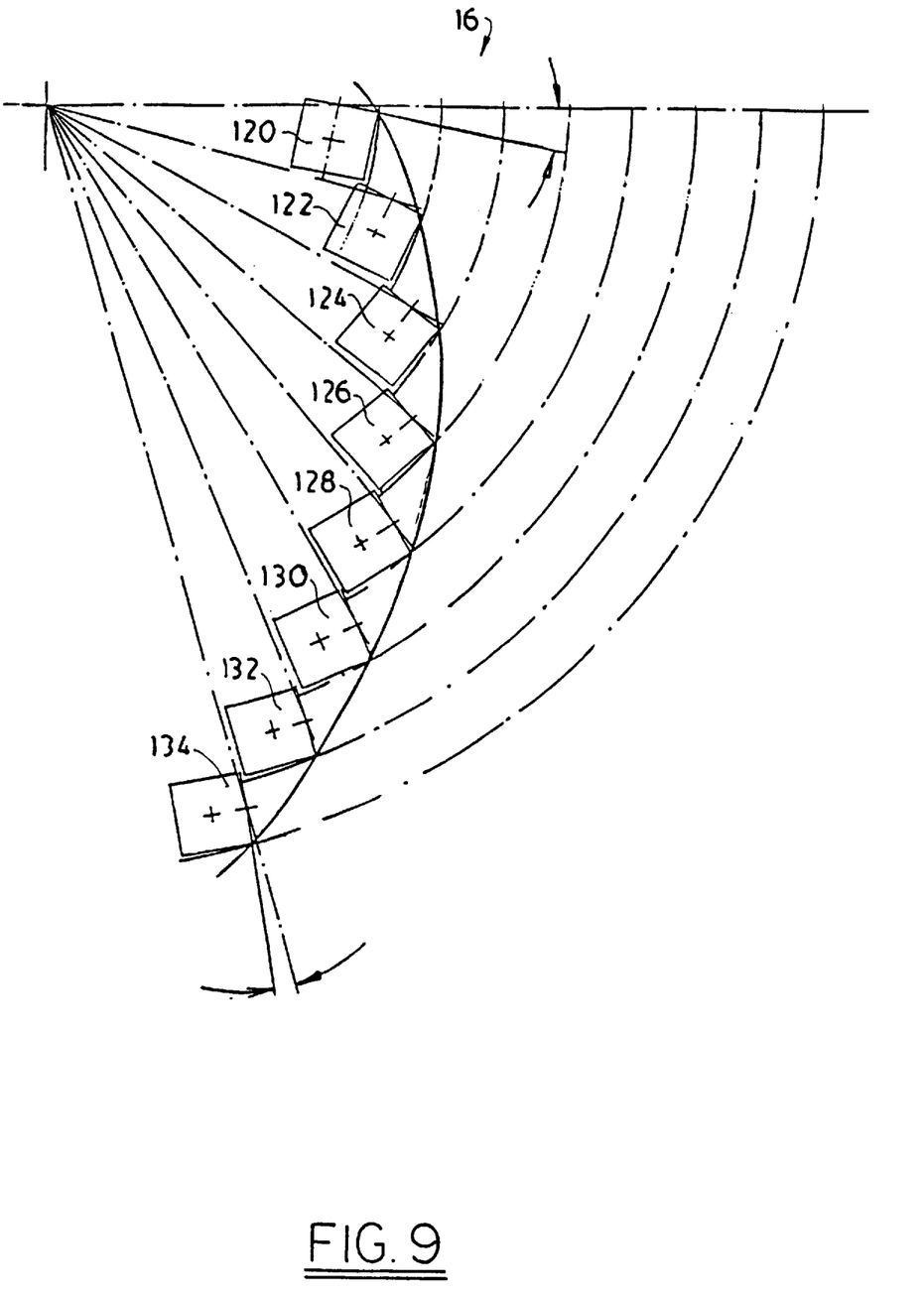
FIG. 9 is a partial view of the end face of the cutter of FIG. 1.

FIG. 9 is a partial view of end face 16 of tool 10 illustrating one preferred tangential arrangement of cutters 120, 122, 124, 126, 128, 130, 132, and 134.

Figure 10:
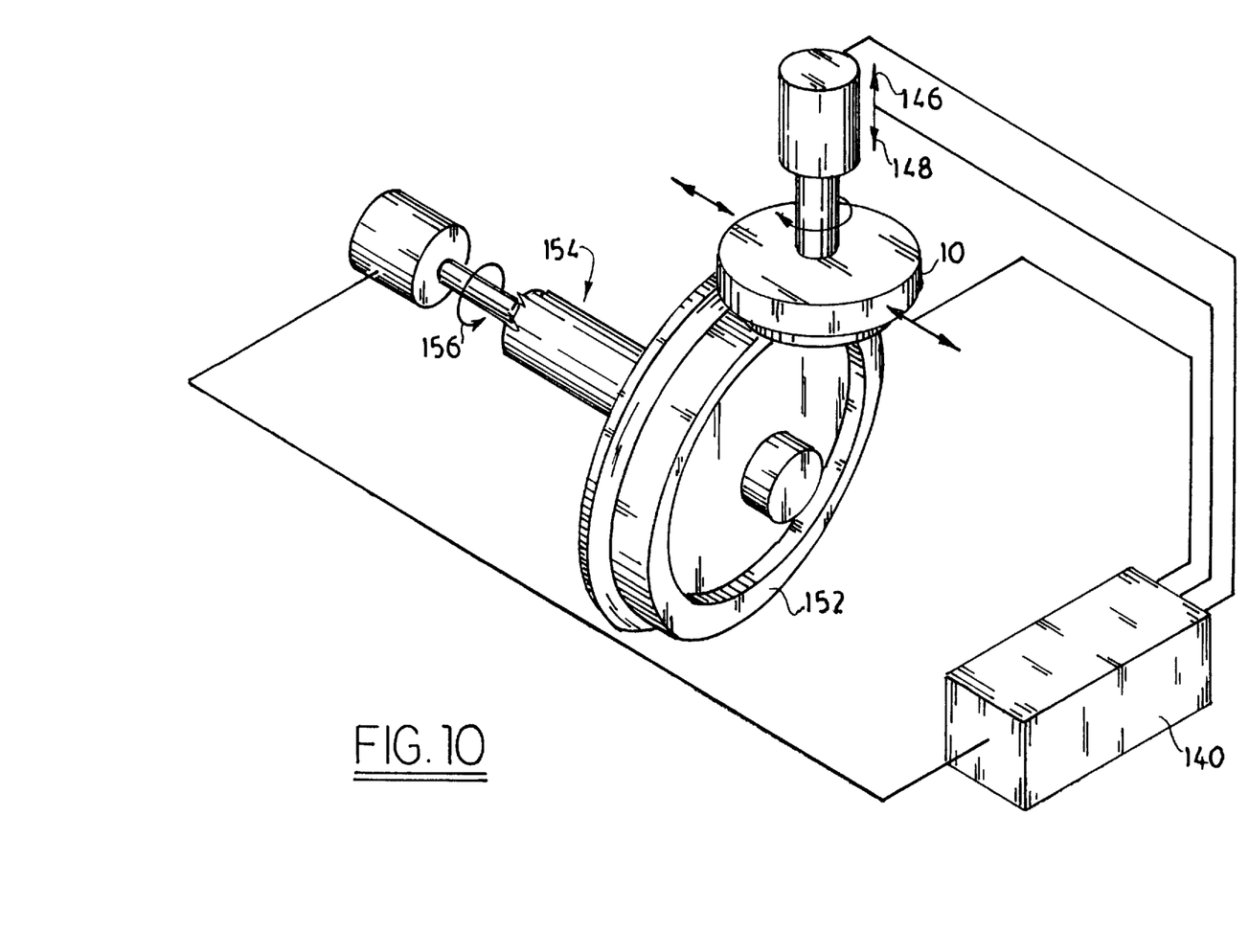
FIG. 10 is a schematic view of one preferred embodiment of the invention as it is being used to shape the wheel of a wheelset.

FIG. 10 is a schematic representation of a cutting tool 10 operatively connected to controller 140, which is adapted to move the cutter 10 vertically in the direction of arrows 146 or 148, to rotate the cutter 10 in, e.g., the direction of arrow 150, and to rotate wheel 152 on wheelset 154 in, e.g., the direction of arrow 156. As will be apparent to those skilled in the art, a multiplicity of other positions of cutter 10 vis-a-vis wheel 152 and/or of the directions of rotation 150 and 156 are possible with this arrangement.

The advantages of applicants' unique cutter will be readily apparent to those skilled in the art.

In one preferred process, stock removal machining of wheelsets is effected with an end milling cutter which duplicates the negative of the required wheel shape due to the disposition of the cutting edges on the cutter, wherein the wheel shape section of the running surface with outside flange face to the tip of the flange is produced in one cut by means of axially vertical round shaping. In one aspect of this process, the wheel flange section of the inside flange face from the wheel surface to the tip of the flange is also produced in one cut by means of axially vertical round shaping with the cutter.

In another aspect of this process, the machining of the wheel shape is carried out by means of two end-milling cutters. The machining process of this, or the other, aspects of the invention may be carried out with the cutter disposed at an eccentricity about 0.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A process for the stock removal machining of a wheelset of a rail vehicle, wherein said wheelset has a wheel shape, comprising the steps of:

(a) disposing a first end milling cutter so that the axis of said first end milling cutter is substantially perpendicular to the axis of said wheelset, wherein said first end milling cutter is comprised of a first end face and a multiplicity of cutters removably attached to said end face of said first end milling cutter, and wherein:

1. each of said cutters is comprised of a first cutting edge, a second cutting edge, a third cutting edge, and a fourth cutting edge,
   2. said apparatus is comprised of means for permitting rotation of each of said cutters to change the positions of said first cutting edge, said second cutting edge, said third cutting edge, and said fourth cutting edge,
   3. said wheelset is comprised o f a running surface wheel section comprised of an outside flange face and a flange tip, (b) rotating said first end milling cutter, and
   (c) duplicating the desired shape of said running surface wheel section in one cut by axial vertical round shaping with said first end milling cutter.

2. The process as recited in claim 1, comprising the step of simultaneously machining said wheelset with said first end milling cutter and a second end milling cutter.

3. The process as recited in claim 2, wherein ten cutter groups of said cutters are disposed on said first end face in a spiral arrangement at a circumferential angle of 18 degrees.

4. The process as recited in claim 3, wherein chip flutes are provided between said cutters disposed on said first end face of said first end milling cutter.

5. The process as recited in claim 1, wherein ten cutter groups of said cutters are disposed on said first end face in a spiral arrangement at a circumferential angle of 18 degrees.

6. The process as recited in claim 1, wherein chip flutes are provided between said cutters disposed on said first end face of said first end milling cutter.

7. A cutting assembly comprised of a first end milling cutter, means for disposing the axis of said first end milling cutter so that it is substantially perpendicular to the axis of a wheelset, and means for rotating said first end milling cutter, wherein said first end milling cutter is comprised of a first end face and a multiplicity of cutters removably attached to said end face of said first end milling cutter, and wherein:

(a) each of said cutters is comprised of a first cutting edge, a second cutting edge, a third cutting edge, and a fourth cutting edge, (b) said apparatus is comprised of means for permitting rotation of each of said cutters to change the positions of said first cutting edge, said second cutting edge, said third cutting edge, and said fourth cutting edge, and (c) said wheelset is comprised of a running surface wheel section comprised of an outside flange face and a flange tip.

8. The apparatus as recited in claim 7, further comprising a second end milling cutter.

9. The apparatus as recited in claim 8, wherein said second end milling cutter is comprised of a second end face and a multiplicity of cutters removably attached to said second end face of said second end mill cutter, wherein:

(a) each of said cutters is comprised of a fifth cutting edge, a sixth cutting edge, a seventh cutting edge, and an eighth cutting edge, and (b) said apparatus is comprised of means for permitting rotation of each of said cutters to change the positions of said fifth cutting edge, said sixth cutting edge, said seventh cutting edge, and said eighth cutting edge.

10. The apparatus as recited in claim 9, wherein ten cutter groups of said cutters are disposed on said first end face in a spiral arrangement at a circumferential angle of 18 degrees.

11. The process as recited in claim 7, wherein chip flutes are provided between said cutters disposed on said first end face of said first end milling cutter.

* * * * *